United States Patent
Urushiya

(10) Patent No.: US 7,433,515 B2
(45) Date of Patent: Oct. 7, 2008

(54) IMAGE PROCESSING APPARATUS AND METHOD FOR PERFORMING GRADATION CONVERSION PROCESSING FOR AN OBJECT IMAGE

(75) Inventor: Hiroyuki Urushiya, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1129 days.

(21) Appl. No.: 10/673,292

(22) Filed: Sep. 30, 2003

(65) Prior Publication Data

US 2004/0091139 A1 May 13, 2004

(30) Foreign Application Priority Data

Oct. 18, 2002 (JP) .............. 2002-305024

(51) Int. Cl.
*G06K 9/00* (2006.01)
(52) U.S. Cl. .................... 382/169
(58) Field of Classification Search ........... None
See application file for complete search history.

(56) References Cited

U.S. PATENT DOCUMENTS

| | | | | |
|---|---|---|---|---|
| 4,641,267 | A | * | 2/1987 | Asai et al. .............. 250/582 |
| 5,046,118 | A | * | 9/1991 | Ajewole et al. ........ 382/169 |
| 5,150,421 | A | | 9/1992 | Morishita et al. ........ 382/6 |
| 5,224,177 | A | * | 6/1993 | Doi et al. .............. 382/168 |
| 5,581,370 | A | | 12/1996 | Fuss et al. ............. 358/447 |
| 5,854,851 | A | * | 12/1998 | Bamberger et al. .... 382/132 |
| 6,215,900 | B1 | | 4/2001 | Schwenker et al. .... 382/168 |
| 6,370,265 | B1 | | 4/2002 | Bell et al. ............. 382/132 |
| 6,574,307 | B1 | * | 6/2003 | Anderton .............. 378/98.7 |
| 6,614,877 | B2 | * | 9/2003 | Anderton .............. 378/98.7 |
| 6,671,394 | B1 | * | 12/2003 | Sako ..................... 382/132 |
| 6,819,794 | B2 | | 11/2004 | Inoue .................... 382/169 |
| 6,934,409 | B2 | * | 8/2005 | Ohara .................... 382/132 |

FOREIGN PATENT DOCUMENTS

| | | |
|---|---|---|
| EP | 0 549 009 A1 | 6/1993 |
| EP | 0 905 650 A2 | 3/1999 |
| EP | 0 953 940 A2 | 11/1999 |
| JP | 8-329241 | 12/1996 |
| JP | 2808773 | 7/1998 |
| JP | 2001-243464 | 9/2001 |

* cited by examiner

Primary Examiner—Matthew C. Bella
Assistant Examiner—Yuzhen Ge
(74) Attorney, Agent, or Firm—Fitzpatrick, Cella, Harper & Scinto

(57) ABSTRACT

An image processing apparatus and method can perform gradation conversion of an image in which flatness of a pixel-value histogram of an image after gradation conversion is excellent, while using a specific gradation conversion function. A gradation conversion function represented using variables for specifying a gradation conversion characteristic is used. The values of the variables are determined based on flatness of a pixel-value histogram of an image obtained by converting an object image with the gradation conversion function. The object image is subjected to gradation conversion with the gradation conversion function determined by the determined values of the variables.

7 Claims, 5 Drawing Sheets

IMAGE PROCESSING APPARATUS AND METHOD FOR PERFORMING GRADATION CONVERSION PROCESSING FOR AN OBJECT IMAGE

BACKGROUND OF THE INVENTION

1. Field of the Invention

The present invention relates to an image processing apparatus and method for converting the gradation of an image, and to a program and a storage medium for realizing such an apparatus and method.

2. Description of the Related Art

Histogram equalization is known as a conventional method for emphasizing the contrast of an entire image. In this method, a gradation conversion function is determined so that the distribution of a histogram after performing gradation conversion is flat (uniform) (For a detailed algorithm, refer to "Digital Image Processing: by Rosenfeld and Kak, translated by Makoto Nagao").

An automatic gradation conversion apparatus utilizing histogram equalization has been disclosed in Japanese Patent Publication No. 2808773. The gradation conversion function is also called a gradation conversion curve. In actual gradation conversion, a look-up table conforming to the gradation conversion function is mostly used.

Conventionally, X-ray images have been mainly film images. Recently, however, the use of digital X-ray images obtained by digital X-ray photographing systems using a large area sensor, CR systems using stimulable phosphors, or the like is in progress. In such X-ray digital images, doctors tend to desire images equivalent to film images because they are accustomed to diagnose using conventional film images. Accordingly, an image equivalent to a film image has been obtained by performing gradation conversion processing using the characteristic curve of a film as a gradation curve.

However, in gradation conversion processing according to histogram equalization, the gradation curve is determined only by flattening of the histogram of an image after conversion. Accordingly, the smoothness of the gradation curve is not guaranteed. As a result, an X-ray digital image frequently becomes an image different from that of a conventional film image. Such an image is difficult for doctors, accustomed to diagnose using conventional film images, to perform exact diagnosis.

SUMMARY OF THE INVENTION

The present invention has been made in consideration of the above-described problems.

It is an object of the present invention to provide an image processing apparatus and method capable of performing gradation conversion in which the flatness of a pixel-value histogram of an image after gradation conversion is excellent, and a program and a storage medium for realizing such a method.

According to the present invention, the foregoing object is attained by providing an image processing apparatus for performing gradation conversion processing for an object image, including determination means for determining variables for specifying a gradation conversion function, from a relationship between the variables and a processed image obtained by performing gradation conversion processing for the object image with the gradation conversion function, and gradation conversion means for performing gradation conversion processing for the object image with the gradation conversion function specified by the variables determined by the determination means.

Further, the foregoing object is also attained by providing an image processing method for performing gradation conversion processing for an object image, including a determination step of determining variables for specifying a gradation conversion function, from a relationship between the variables and a processed image obtained by performing gradation conversion processing for the object image with the gradation conversion function, and a gradation conversion step of performing gradation conversion processing for the object image with the gradation conversion function specified by the variables determined in the determination step.

According to another aspect, the present invention relates to a computer readable storage medium storing a program for causing a computer to realize the functions of the above-described image processing apparatus.

According to still another aspect, the present invention relates to a program for causing a computer to execute the steps of the above-described image processing method.

According to yet another aspect, the present invention relates to a computer readable storage medium storing a program for causing a computer to execute the steps of the above-described image processing method.

Other objects, features and advantages of the present invention will be apparent from the following descriptions taken in conjunction with the accompanying drawings, in which like reference numerals designate the same or similar parts through the figures thereof

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DETAILED DESCRIPTION OF THE PREFERRED EMBODIMENTS

A preferred embodiment of the present invention will now be described in detail with reference to the accompanying drawings.

Figure 1:
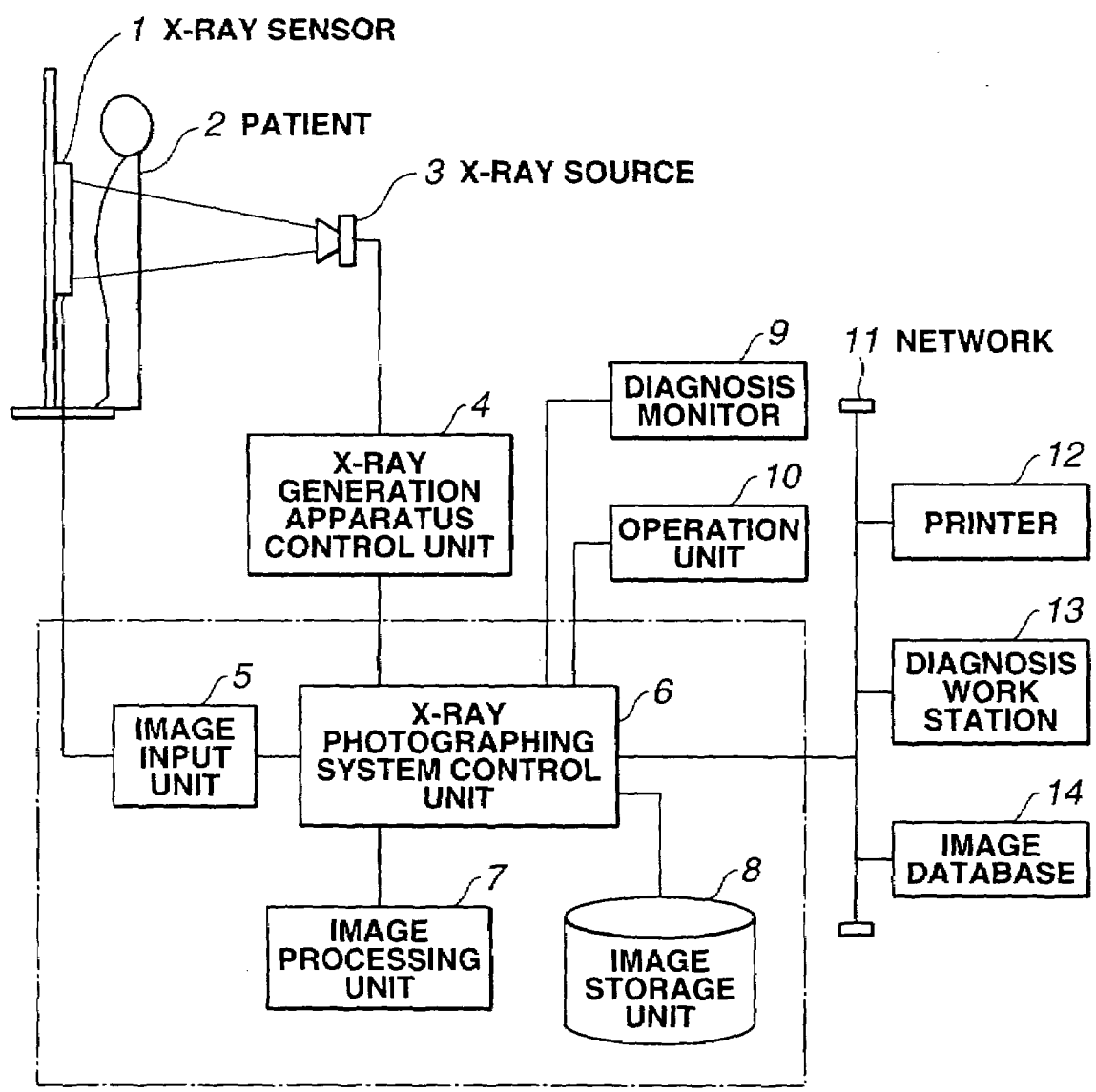
FIG. 1 is a schematic diagram illustrating the entire configuration of a radiation-image processing system utilizing an image processing apparatus according to an embodiment of the present invention.

FIG. 1 is a schematic diagram illustrating the entire configuration of a radiation-image processing system utilizing an image processing apparatus according to the embodiment.

As indicated within a region surrounded by a one-dot chain line in FIG. 1, the image processing apparatus of the embodiment includes an image input unit 5, an X-ray photographing system control unit 6, an image processing unit 7, and an image storage unit 8. X rays generated by an X-ray source 3 controlled by an X-ray generation apparatus control unit 4 are detected by an X-ray sensor 1 after passing through a patient 2. The detected X rays are input to the image input unit 5 as a digital X-ray image. The input digital X-ray image is subjected to image processing, such as X-ray-sensor correction processing, gradation processing, spatial filtering processing, and the like, by the image processing unit 7. The digital X-ray image subjected to the image processing is displayed on a diagnosis monitor 9, stored in the image storage unit 8, or output to a printer 12, a diagnosis work station 13 or an image database 14 via a network 11. When the displayed or output image is unsatisfactory, image processing and display are repeated, for example, by changing an image processing parameter. The above-described operations are performed through an operation unit 10.

Figure 2:
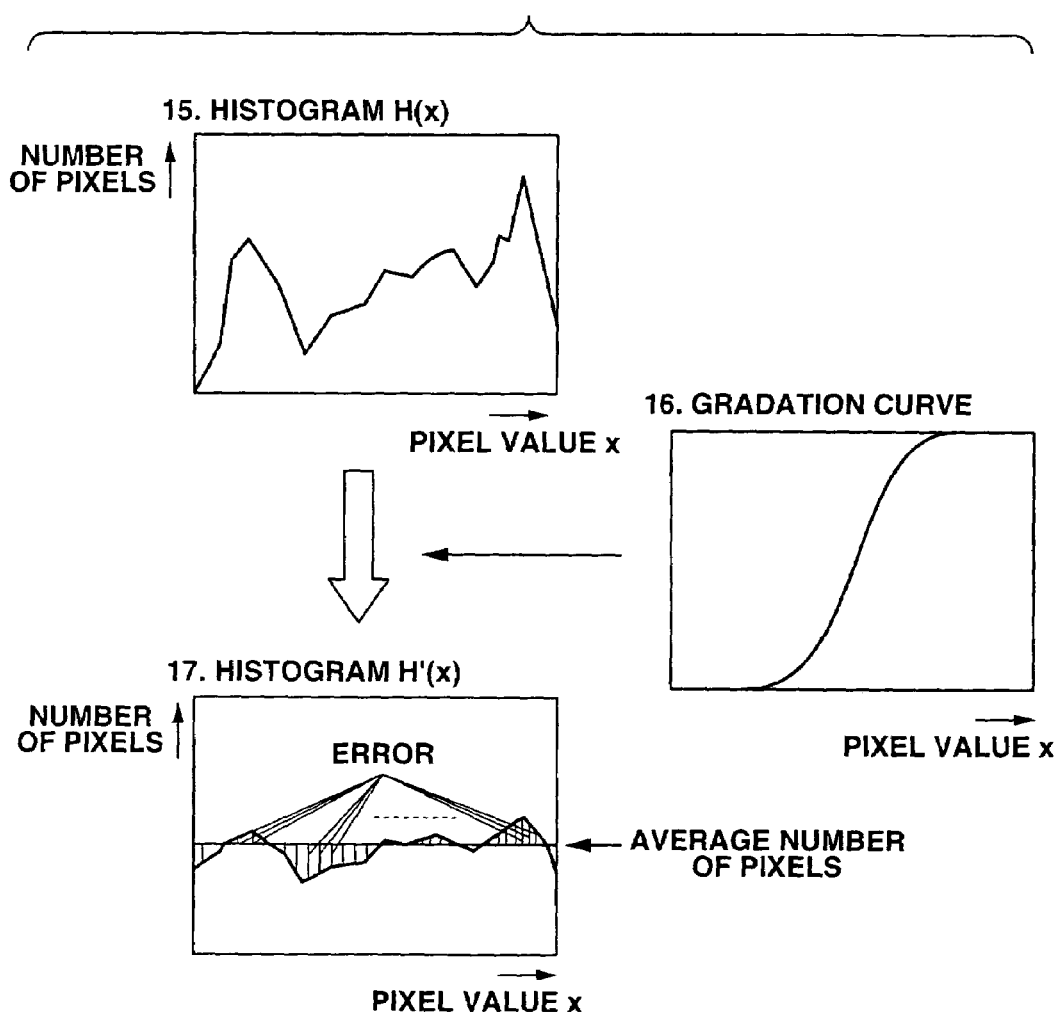
FIG. 2 schematically illustrates gradation conversion processing according to the embodiment.

FIG. 2 schematically illustrates an example of gradation conversion processing operating in this embodiment. A histogram H(x) 15 is a histogram of an image before being subjected to gradation conversion processing. A histogram H'(x) 17 is a histogram of a converted image obtained by performing gradation conversion processing with a gradation curve f(x) 16 for the image having the histogram H(x) 15. When the histogram H'(x) 17 is entirely flat (uniform), the number of pixels having each pixel value is an average number of pixels obtained by dividing the number of pixels of the entire image by the number of pixel values that the image can have. In this embodiment, a means square error between a case in which the histogram is completely uniform and the histogram H'(x) 17 is obtained, and the obtained value is used as an evaluation reference for the flatness of the pixel-value histogram of the image after gradation conversion. The evaluation reference for the flatness is not limited to the mean square error. Any other appropriate reference may be used, provided that it operates as a criterion for the amount of deviation between the pixel-value histogram of an image after gradation conversion and a flat pixel-value histogram. As the amount of deviation becomes smaller, the flatness becomes superior.

That is, while providing a restriction condition so as to be equivalent to the characteristic curve of a film, the gradation curve f(x) 16 in which the evaluation reference represented by the mean square error is minimized is obtained. This operation will now be more specifically described.

First, a pixel value of a digital image is represented by $\chi i$. If the number of levels that pixel values can have is represented by M, $\chi 1 \leq \chi i \leq \chi M$. For example, in the case of an image having 12-bit pixel values, M=4,096, $\chi 1$=0, and $\chi M$=4,095. In the case of an image having 10-bit pixel values, M=1,024, $\chi 1$=0, and $\chi M$=1,023. The histogram of the digital image is represented by $H(\chi i)$.

A gradation curve (gradation conversion function) is represented by $f(\chi i: a_1, a_2, \ldots, a_N)$, which is a function defined by N parameters (variables) $a_1, a_2, \ldots, a_N$. That is, the gradation conversion characteristic of the gradation conversion function f is specified by the values of the N variables. The following Equation 1 expresses a sigmoid function that is a function representing a gradation curve equivalent to the characteristic curve of a film:

$$f(\chi: a_1, a_2, a_3, a_4, a_5) = a_3/(1+e^{-a_1(a_5 \times \chi - a_2)}) + a_4 \quad \text{(Equation 1)}.$$

Figure 3:
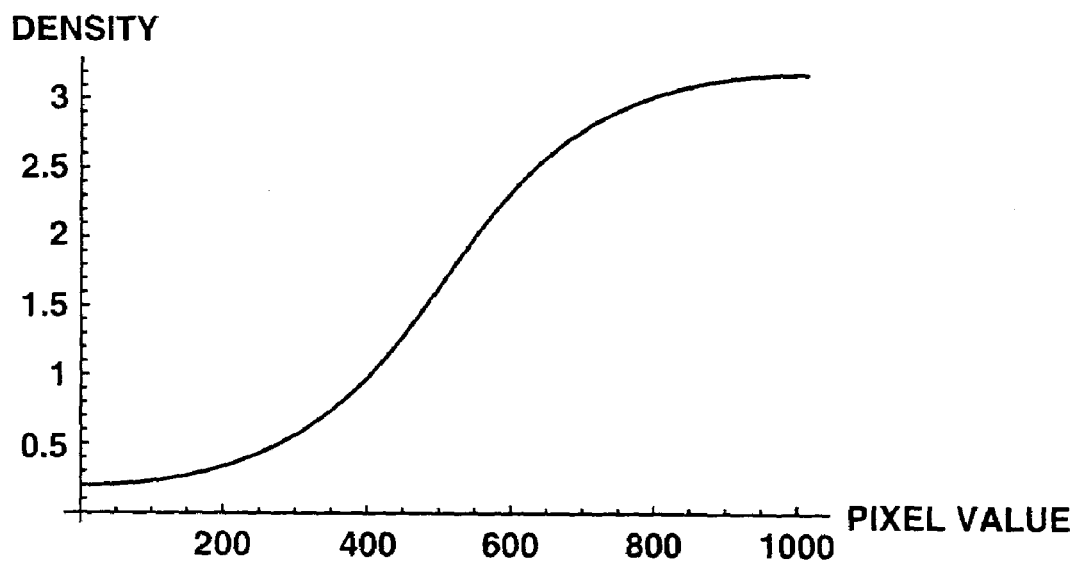
FIGS. 3, 4, 5 are graphs, each illustrating a gradation curve applicable to the embodiment.

In this function, if $(a_1, a_2, a_3, a_4, a_N)$=(1, 5, 3, 0.2, 1/102.4), a graph shown in FIG. 3 in which a 10-bit image is assumed is obtained. If $(a_1, a_2, a_3, a_4, a_N)$=(2, 5, 3, 0.2, 1/102.4), a graph shown in FIG. 4 in which the contrast of the graph shown in FIG. 3 is doubled is obtained.

Although this function can only provide an S-shaped curve having symmetrical contrast, an S-shaped curve having asymmetrical contrast can be realized by a function expressed by the following equation:

$$f(\chi: a_1, a_2, a_3, a_4, a_5, a_6, a_7, a_8, a_9) = a_8 \times ((1/(1+e^{-a_1(a_5 \times \chi - a_2)})) + a_7/(1+e^{-a_3(a_6 \times \chi - a_4)})) + a_9 \quad \text{(Equation 2)}.$$

Figure 5:
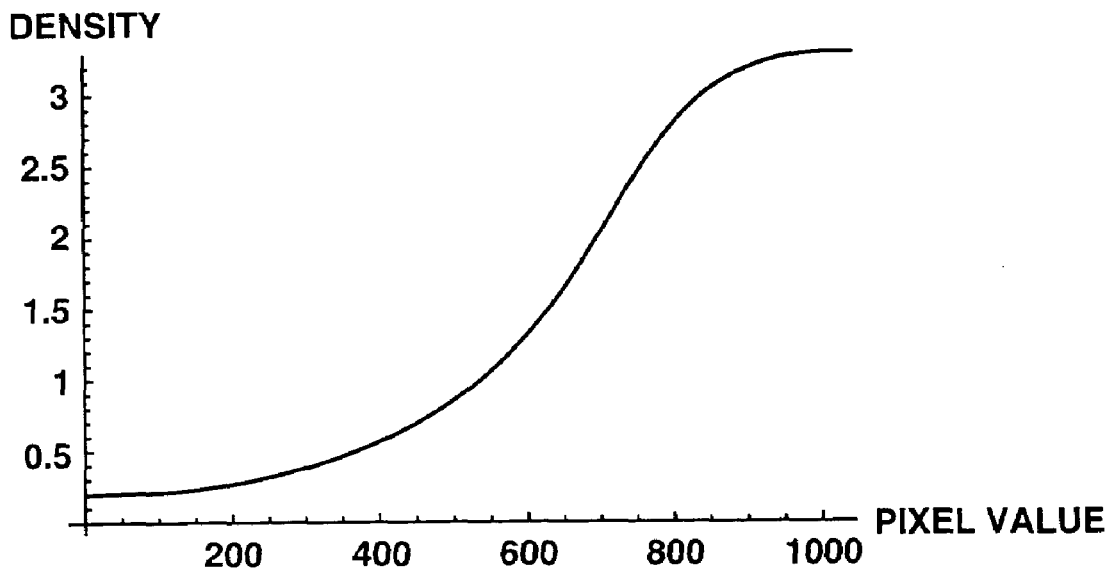

In this function, if $(a_1, a_2, a_3, a_4, a_5, a_6, a_7, a_8, a_9)$=(1, 5, 2, 7, 1/102.4, 1/102.4, 1, 1.5, 0.2), a graph shown in FIG. 5 is obtained. Such a curve is used for a chest portion in order to provide a large contrast for a lung portion having high pixel values and a small contrast at a mediastinum having low pixel values. In FIG. 5, the ordinate represents density as in the case of the characteristic curve of a film.

By thus defining the function of the gradation curve and changing parameters, a gradation curve corresponding to each type of film can be obtained. The histogram of a digital image (in which each pixel value is the function of $a_1$, $a_2, \ldots, a_N$) after being converted with the above-described gradation curve $f(\chi: a_1, a_2, \ldots, a_N)$ is represented by $H'(\chi i)$. The $H\chi(\chi i)$ can be expressed by $H'(f(\chi i: a_1, a_2, \ldots, a_N))$.

The sum Ie of square errors between the $H'(\chi i)$ and a histogram $H''(\chi i)$=m (m is the average number of pixels) that is uniform over the entire pixel values is obtained. Ie is the function of the parameters of a gradation-curve function expressed by the following equation:

$$Ie(a_1, a_2, \ldots, a_N) = \sum_{i=1}^{M} |m - H'(\chi i)|^2 = \sum_{i=1}^{M} |m - H'(f(\chi i: a_1, a_2, \ldots, a_N))|^2. \quad \text{(Equation 3)}$$

The parameters are determined so as to minimize the sum Ie of square errors. If equivalence to the characteristic curve of a film is maintained even if these parameters are handled as parameters not having limitations, simultaneous equations as expressed by the following Equation 4 in which partial differentiation of each of parameters $a_1, a_2, \ldots, a_N$ in the Ie $(a_1, a_2, \ldots, a_N)$ is set to 0 are obtained. By solving these equations, the parameters $a_1, a_2, \ldots, a_N$ can be obtained.

$$\partial Ie(a_1, a_2, \cdots, a_N)/\partial a_1 = 0 \quad \text{(Equation 4)}$$
$$\partial Ie(a_1, a_2, \cdots, a_N)/\partial a_2 = 0$$
$$\vdots$$
$$\partial Ie(a_1, a_2, \cdots, a_N)/\partial a_N = 0.$$

In a gradation curve $f(\chi: a_1, a_2, \chi, a_N)$ using the parameters $a_1, a_2, \ldots, a_N$ obtained by solving these simultaneous equations, uniformity of a histogram after conversion is maximized while maintaining equivalency to a film. Then, gradation conversion of image information input to the image input unit 5 is performed based on the gradation curve $f(\chi: a_1, a_2, \ldots, a_N)$ using the parameters $a_1, a_2, \ldots, a_N$ obtained by solving the above-described simultaneous equations, and resultant data is output from information output means, such as the diagnosis monitor 9 or the like.

Figure 4:
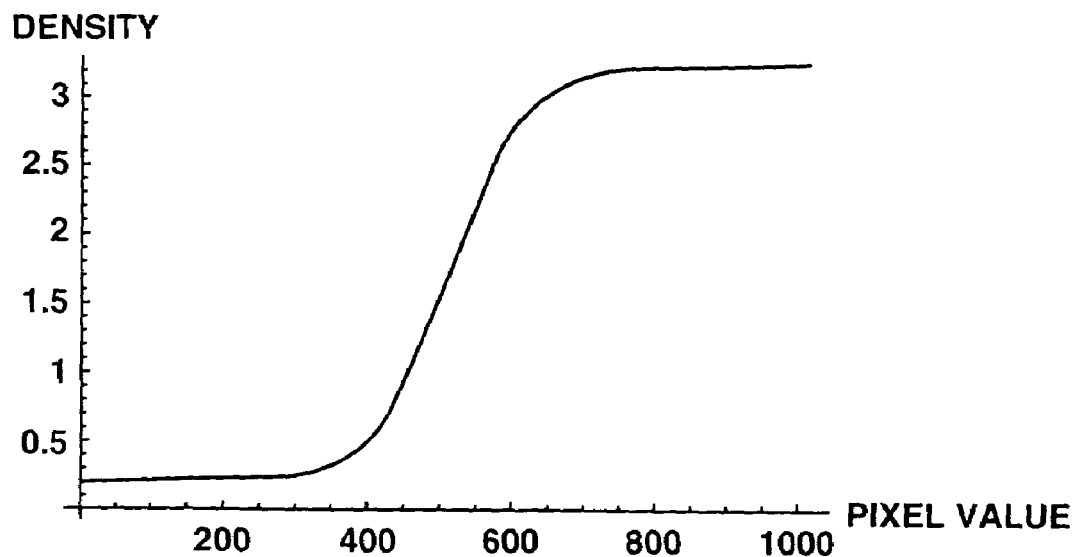

In a simple example of a case in which equivalency to the characteristic curve of a film is not maintained if limitation is not provided for parameters, specific parameters are handled as parameters not having limitation, and other parameters are fixed with constants. For example, in Equation 1, only parameters $a_1$ and $a_2$ are handled as variables, and other parameters $a_3$, $a_4$ and $a_5$ are fixed. It is thereby possible to change contrast or perform shift in a lateral direction while maintaining an S-shaped curve, as shown in FIG. 3 or FIG. 4.

In this case, Ie is the function of $a_1$ and $a_2$, and $a_1$ and $a_2$ can be obtained by solving simultaneous equations in which the Ie is partially differentiated by $a_1$ and $a_2$. Various further complicated restriction conditions for parameters can be considered. When intending to perform optimization in such restriction conditions, for example, refer to "Optimization by Vector Space Methods: by David G. Luenberger, translated by Masami Masubuchi and Hideaki Kano, published by Corona Sha" that describes various methods, such as a method using Lagrange's multipliers, a method in the case of inequality restriction conditions, and the like. The parameters may be optimized by using one of these methods.

Figure 6:
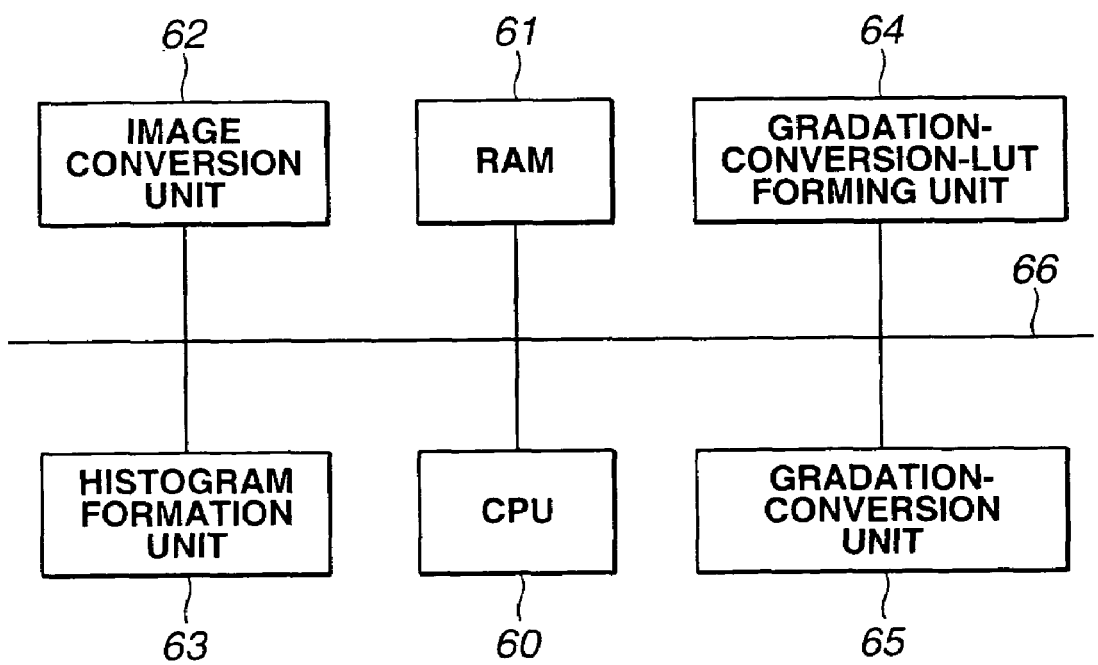
FIG. 6 is a diagram illustrating the configuration of an image processing unit shown in FIG. 1.

For example, the above-described gradation conversion processing can be realized by configuring the image processing unit 7 as shown in FIG. 6. In FIG. 6, the image processing unit 7 includes a CPU (central processing unit) 60 for controlling the entire image processing unit 7, a RAM (random access memory) 61, serving as storage means for storing programs, data, object images and the like necessary for operations of the CPU 60, an image conversion unit 62 for performing gradation conversion of an object image with the gradation conversion function f ($\chi$: $a_1, a_2, \ldots, a_N$), a histogram formation unit 63 for forming a pixel-value histogram H'($\chi$i) expressed by variables obtained by the image conversion unit 62, a gradation-conversion-LUT forming unit (gradation-conversion-function setting unit) for forming a gradation conversion look-up table (LUT) by obtaining variables $a_1, a_2, \ldots, a_N$ for minimizing square errors between the pixel-value histogram H'($\chi$i) obtained by the histogram formation unit 63 and a flat histogram H"($\chi$i)=m, and a gradation conversion unit 65 for performing gradation conversion of an object image using the gradation conversion LUT obtained by the gradation-conversion-LUT forming unit 64. A CPU bus 66 interconnects the respective units 60-65 so as to be able to perform communication.

The respective units 62-65 may be configured, for example, using integrated circuits or the like. The functions of the respective units 62-65 may also be realized by executing predetermined programs stored in the RAM 61 or the like by the CPU 60. In this case, the programs may include program codes corresponding, for example, to an image processing method shown in the flowchart of FIG. 7.

Figure 7:
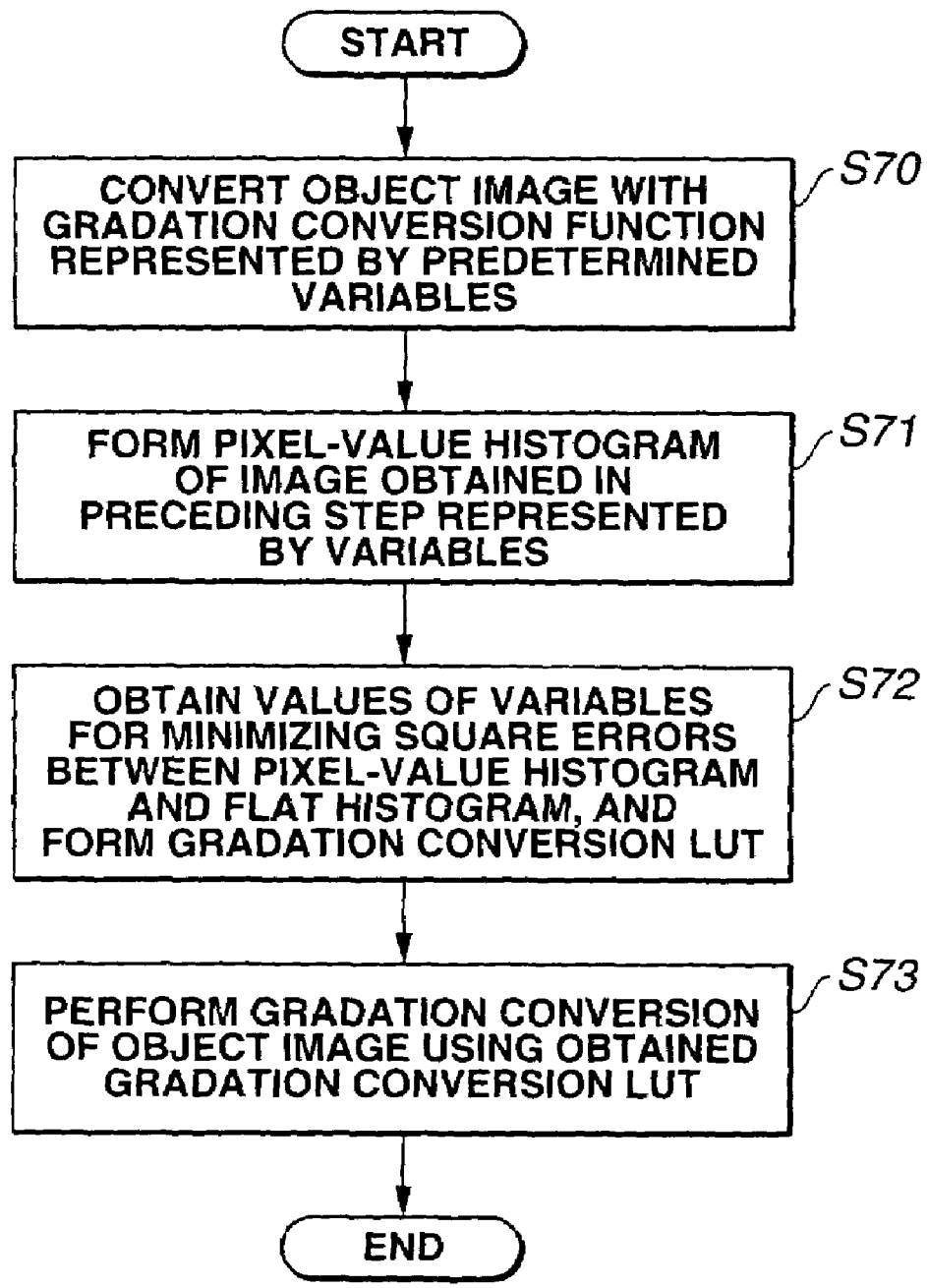
FIG. 7 is a flowchart illustrating an image processing method according to the embodiment.

Next, the image processing method will be described with respect to FIG. 7. First, by performing gradation conversion of an object image with the gradation conversion function f ($\chi$: $a_1, a_2, \ldots, a_N$), an image having pixel values represented by predetermined variables is obtained (image conversion step S70). Then, the pixel-value histogram H'($\chi$i) of the image represented by the variables is formed (histogram forming processing S71). Then, the values of variables $a_1, a_2, \ldots, a_N$ for minimizing square errors between the pixel-value histogram H'($\chi$i) obtained in the preceding step and a flat histogram H"($\chi$i)=m is obtained, and a gradation conversion LUT is formed (gradation-conversion-LUT forming step S72). Then, the object image is subjected to gradation conversion using the gradation conversion LUT obtained in the preceding step (gradation conversion step S73).

According to the above-described embodiment, since it is possible to perform gradation conversion so as to provide picture quality equivalent to a film, and realize gradation conversion in which contrast is effectively allocated so that a histogram after conversion is as uniform as possible, the diagnosis capability can be improved by providing a doctor with an image obtained by this gradation conversion.

The object of the present invention may also be achieved by supplying a computer (a CPU or an MPU (microprocessor unit)) within an apparatus or a system connected to various devices with program codes of software, and realizing the functions of the above-described embodiment by operating the various devices in accordance with the supplied program by the computer of the system or the apparatus.

In such a case, the program codes themselves of the software realize the functions of the above-described embodiment, so that the program codes themselves constitute the present invention. A computer network (a LAN (local area network), a WAN (wide area network), such as Internet or the like, a radio communication network, or the like) for transmitting and supplying program information as a predetermined signal, or a communication medium in the system (a wire network, for example, using optical fibers, a radio network, or the like) may be used as a medium for supplying the program codes.

Furthermore, means for supplying a computer with the program codes, such as a storage medium storing the program codes, constitutes the present invention. For example, a flexible disk, a hard disk, an optical disk, a magnetooptical disk, a CD(compact disc)-ROM (read-only memory), a magnetic tape, a nonvolatile memory card, a ROM or the like may be used as the storage medium storing the program codes.

Not only in a case in which the functions of the above-described embodiment are realized by executing the supplied program codes by a computer, but also in a case in which the functions of the above-described embodiment are realized by cooperation of the program codes with an OS (operating system) operating in a computer, other application software or the like, the program codes, of course, constitute the present invention.

In a case in which after storing supplied program codes into a memory provided in a function expanding board of a computer or in a function expanding unit connected to the computer, a CPU or the like provided in the function expanding board or the function expanding unit performs a part or the entirety of actual processing, and the functions of the above-described embodiment are realized by the processing, the program codes, of course, constitutes the present invention.

The present invention may also be applied to a system including a plurality of apparatuses (e.g., radiation generating apparatuses, radiographic apparatuses, image processing apparatuses, interface apparatuses, and the like) and to a single apparatus in which the functions of these apparatuses are integrated. When the present invention is applied to a system including a plurality of apparatuses, the apparatuses communicate with one another via, for example, electrical, optical, and/or mechanical means, and/or the like.

Furthermore, the present invention may also be applied to an image diagnosis aiding system including a network (LAN and/or WAN, or the like).

The present invention thus achieves the above-described object as described above.

The individual components designated by blocks in the drawings are all well known in the image processing apparatus and method arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus for performing gradation conversion processing for an object image, said apparatus comprising:

determination means for determining variables for specifying a gradation conversion function, from a relationship between the variables and a processed image obtained by performing gradation conversion processing for the object image with the gradation conversion function;

gradation conversion means for performing gradation conversion processing for the object image with the gradation conversion function specified by the variables determined by said determination means;

histogram forming means for forming a histogram of the processed image obtained by performing the gradation conversion processing of the object image with the gradation conversion function specified by the variables;

index calculation means for calculating an index from the histogram obtained by said histogram forming means and an average number of pixels of the object image; and analysis means for analyzing a relationship between the index obtained by said index calculation means and the variables, and determining the variables for specifying the gradation conversion function for performing gradation conversion of the object image from a result of the analysis.

2. An image processing method for performing gradation conversion processing for an object image, said method comprising:

a determination step, of determining variables for specifying a gradation conversion function, from a relationship between the variables and a processed image obtained by performing gradation conversion processing for the object image with the gradation conversion function;

a gradation conversion step, of performing gradation conversion processing for the object image with the gradation conversion function specified by the variables determined in said determination step;

a histogram forming step, of forming a histogram of the processed image obtained by the variables for specifying the gradation conversion function and by performing the gradation conversion processing of the object image with the gradation conversion function;

an index calculation step, of calculating an index from the histogram obtained in said histogram forming step and an average number of pixels of the object image; and an analysis step, of analyzing a relationship between the index obtained in said index calculation step and the variables, and determining the variables for specifying the gradation conversion function for performing gradation conversion of the object image from a result of the analysis.

3. An image processing method according to claim 2, wherein in said determination step, the variables are determined so that the flatness of a histogram of the processed image is maximized.

4. An image processing method according to claim 2, wherein in said determination step, the variables are determined so that a mean square error between pixel values of the processed image and a flat pixel-value histogram of the processed image is minimized.

5. An image processing method according to claim 2, wherein the variables for identifying the gradation conversion function are restricted so as to vary only within a range equivalent to a characteristic curve of a film.

6. A computer-readable medium storing a computer program for causing a computer to perform the functions of an image processing apparatus according to claim 1.

7. A computer-readable medium storing a computer program for causing a computer to execute the steps of an image processing method according to any one of claims 2-4, and 5.

* * * * *